United States Patent
Pacher et al.

(10) Patent No.: US 6,764,186 B2
(45) Date of Patent: Jul. 20, 2004

(54) DRIVE DEVICE FOR ADJUSTING THE MIRROR ASSEMBLY OF A REARVIEW MIRROR

(75) Inventors: Wolfgang Pacher, Gloisdorf (AT); Johann Stark, Graz (AT)

(73) Assignee: Magna Reflex Holding GmbH, Assamstadt (DE)

( * ) Notice: Subject to any disclaimer, the term of this patent is extended or adjusted under 35 U.S.C. 154(b) by 88 days.

(21) Appl. No.: 10/258,726
(22) PCT Filed: Apr. 27, 2001
(86) PCT No.: PCT/EP01/04840
§ 371 (c)(1), (2), (4) Date: Oct. 25, 2002
(87) PCT Pub. No.: WO01/83265
PCT Pub. Date: Nov. 8, 2001

(65) Prior Publication Data
US 2003/0137756 A1 Jul. 24, 2003

(30) Foreign Application Priority Data
Apr. 27, 2000  (DE) ......................................... 100 21 305

(51) Int. Cl.⁷ .............................. G02B 5/08; G02B 7/18
(52) U.S. Cl. ........................ 359/841; 359/877; 248/476
(58) Field of Search ................................ 359/841, 872, 359/877; 248/476, 479

(56) References Cited

U.S. PATENT DOCUMENTS 4,998,812 A  * 3/1991  Hou ........................... 359/841
5,050,975 A    9/1991  Tsui
6,672,726 B1 * 1/2004  Boddy et al. ................ 359/841

FOREIGN PATENT DOCUMENTS

DE        3600869      7/1987
JP        59195451     11/1984

* cited by examiner

*Primary Examiner*—Mark A. Robinson
(74) *Attorney, Agent, or Firm*—McGarry Bair PC

(57) ABSTRACT

The invention relates to a drive device for adjusting the mirror assembly of a rearview mirror comprising a mirror base and a mirror head, which accommodates the mirror assembly and which can be positioned between a first and a second position via a pivot. The drive device comprises an electric motor assembly and a control switch, which specifies the direction of the adjustment of the mirror assembly and which, according to the actuation thereof, furnishes electrical signals to the electric motor assembly for the adjustment of the mirror assembly. The inventive device is also equipped with a switch-over device, which comprises a position switch and which, according to the switching state of the position switch, switches over the signals furnished to the electric motor assembly in such a manner that in both the first as well as in the second position of the mirror head, the relation between the direction of adjustment, which is specified by the control switch, and the adjusting direction of the mirror assembly remains unchanged.

36 Claims, 2 Drawing Sheets

DRIVE DEVICE FOR ADJUSTING THE MIRROR ASSEMBLY OF A REARVIEW MIRROR

Figure 1:
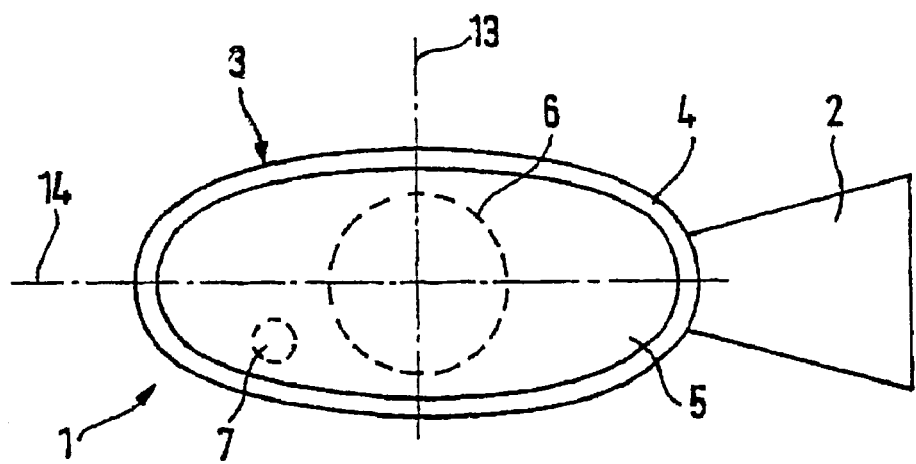
Figure 1:
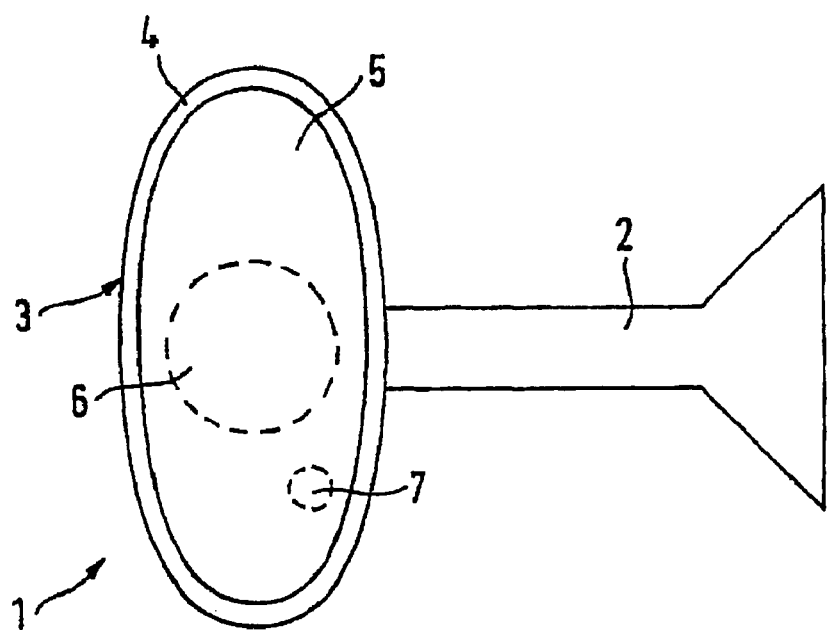

The invention concerns a drive device for adjusting the mirror assembly of a rear-view mirror for a vehicle according to the introductory part of the main claim.

A rear-view mirror comprises in a known manner a mirror base which is attached to a vehicle and a mirror head consisting of a mirror head housing and a mirror glass assembly held in the housing and an adjusting drive connected to the mirror glass assembly. The adjusting drive usually has two electric motors, a horizontal motor and a vertical motor, which pivot the mirror glass assembly by means of an associated mechanism about a horizontal axis and a vertical axis. Adjustment of the mirror assembly is controlled by means of an operating switch which is arranged in the interior of the vehicle and can be operated by the driver or front-seat passenger. In this case the operating switch usually can be operated in four directions, wherein, depending on the direction of operation, different motor signals which steer the respective vertical or horizontal motor in one or the other direction are delivered. Usually the electrical connection between the operating switch and the adjusting drive consists of three wires, wherein one wire is connected both to the vertical motor and to the horizontal motor and the other two wires are connected to the horizontal motor or to the vertical motor respectively.

For larger vehicles or trailers, there are used rear-view mirrors in which the mirror head can be rotated about a pivot point for example from a horizontal position to a vertical position, so that in certain situations what is happening around the vehicle and behind the vehicle can be observed better. As the adjusting drive which is in the mirror housing is rotated with the mirror head, there is no longer coordination between vertical and horizontal adjustments of the operating switch and vertical and horizontal adjustments of the mirror glass or mirror glass assembly.

It is therefore the object of the invention to provide a drive device for adjusting the mirror assembly of a rear-view mirror, which even on rotation of the mirror head in relation to the mirror base out of a first position, for example a horizontal position, into a second position, for example a vertical position, retains the coordination between the respective direction of adjustment delivered by the operating switch and the direction of adjustment of the mirror glass.

This object is achieved according to the invention by the characterising features of the main claim in conjunction with the features of the introductory part.

Due to the fact that the drive device has an electrical/ electronic switch-over device which includes a position switch, wherein the position switch occupies different switching states depending on the first and second positions, and that the switch-over device switches the signals delivered to the electric motor assembly as a function of the switching state of the position switch in such a way that both in the first and in the second position of the mirror head the coordination between the direction of locking predetermined by the operating switch and the direction of adjustment of the mirror assembly is maintained, it is possible to move the mirror head into different positions to improve the capacity for recognition of the situation behind and beside the vehicle, without the user having to alter his habits with respect to the setting of the mirror assembly of the mirror head.

Due to the measures provided in the subsidiary claims, advantageous developments and improvements are possible.

It is particularly advantageous that with two electric motors, a horizontal motor and a vertical motor, and with a voltage supply via three wires, the motors being connected to a common wire and to the respectively remaining separate wires, there are provided two relays via whose contacts, depending on operation of the operating switch and on the switching state of the position switch, the horizontal motor is used sometimes for horizontal adjustment and sometimes for vertical adjustment and in a corresponding manner the vertical motor is used sometimes for vertical adjustment and sometimes for horizontal adjustment. At the same time the contacts of one of the relays carry out a necessary reversal of the direction of rotation of at least one of the motors.

Furthermore, in an advantageous manner the voltage supply of the switch-over device is obtained from the respective adjustment signals for the motors, wherein the relays are supplied via an OR link of the signals for horizontal or vertical adjustment, which link is made by diodes, advantageously of a rectifier bridge. By connecting the diodes or linking each to a transistor, interlocking of the motor signals is formed to avoid an inductive disturbance to the other one.

For the position switch which detects the position of the mirror head and in one of the positions closes a circuit of the switch-over device, any switches can be used, for example mechanical, electrooptical, inductive, capacitive, magnetic switches or a combination thereof.

A practical example of the invention is shown in the drawings and described in more detail in the description below. They show:

FIG. 1 a view of a rear-view mirror according to the invention and

Figure 2:
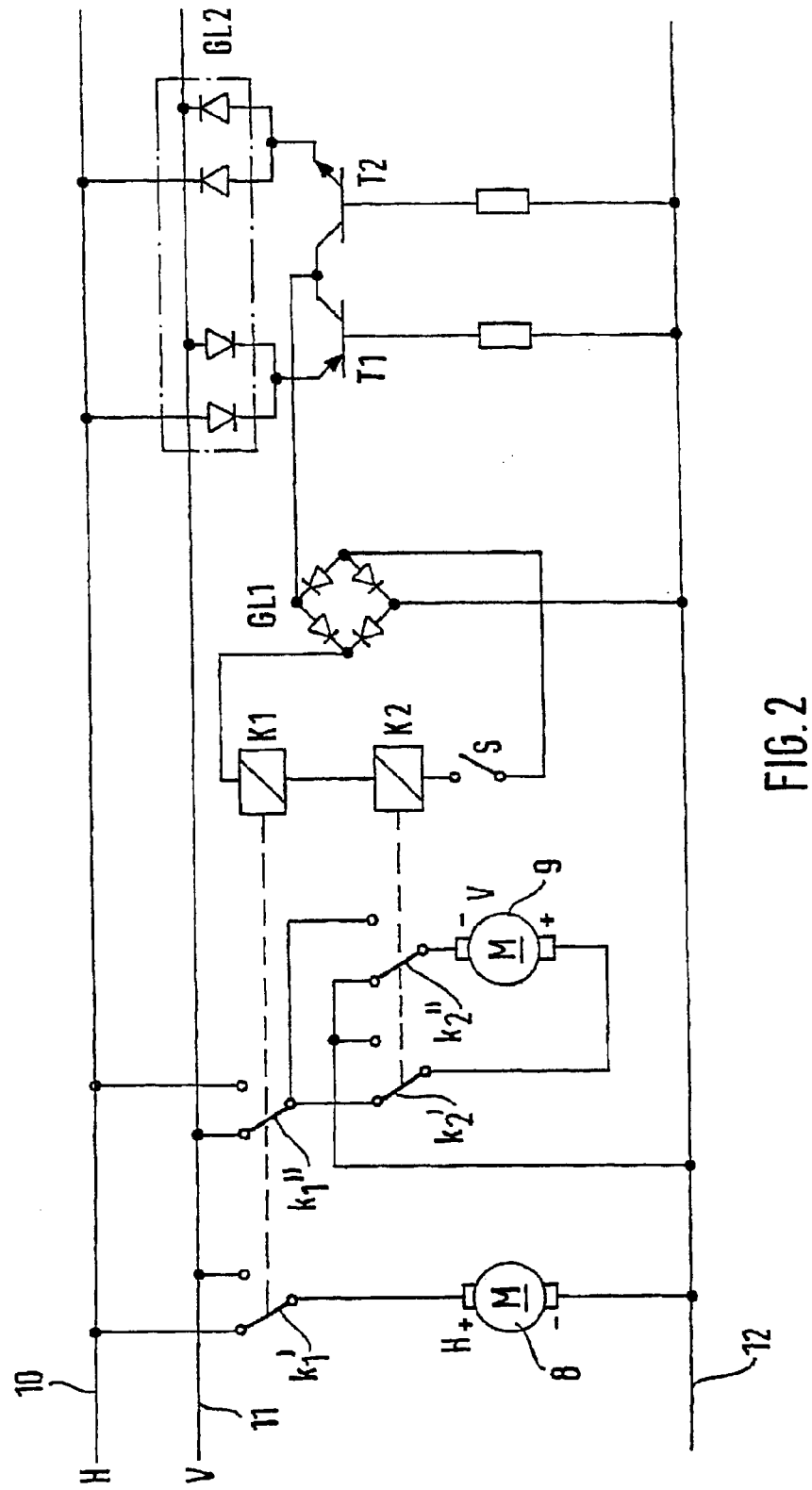

FIG. 2 a circuit design of the switch-over device according to the present invention.

In FIG. 1 is shown a rear-view mirror 1 which is attached by a mirror base 2 to a motor vehicle and has a mirror head 3 connected to the mirror base 2. The mirror head includes a housing 4 and a mirror glass pane or a mirror glass assembly 5 which is adjustable relative to the housing 4 by an adjusting drive 6 shown by broken lines, so that the mirror plate 5 can be adapted to the angle of view of the driver. The mirror head 3 is adjustable relative to the mirror head 2 about a schematically shown pivot point 7, so that the mirror head 3 is pivotable out of a horizontal position according to the top of FIG. 1 into a vertical position according to the bottom of FIG. 1. This change of setting is made manually by the driver. As can be seen from the bottom of FIG. 1, the vertical position of the mirror head is to be recommended when the vehicle is long or a trailer is coupled.

The adjusting drive 6 is usually connected by electrical wires, not shown, to an operating switch which is provided in the interior of the motor vehicle and which can be operated in the desired direction of adjustment and which via the wires delivers voltage signals to the drive 6. Usually the operating switch can be activated in four directions, in the horizontal to left and right and in the vertical up and down. on activation of the operating switch to right or to left, the mirror 5 according to the top of FIG. 1 is rotated about the vertical axis 13 into the plane of drawing or out of the plane of drawing. The same applies to activation of the operating switch in the vertical or up and down, wherein then the mirror glass according to the top of FIG. 1 is adjusted about the horizontal axis 14 out of the plane of drawing or into the plane of drawing.

In order that, in a position of the mirror head 3 according to the bottom of FIG. 1 too, the coordination between the directions of adjustment of the mirror glass 5 and the directions of activation of the operating switch is provided, according to the invention an electrical switch-over device is provided, which is shown in more detail in FIG. 2. The switch-over device is integrated in the adjusting drive or can be added supplementary.

The drive 6 usually includes two motors 8, 9, which are here referred to as the horizontal motor and vertical motor, these terms corresponding to the top of FIG. 1, i.e. the state of the circuit shown corresponds to the state according to the top of FIG. 1.

The motors 8, 9, whose drive shafts are connected to a gear assembly, form part of an electrical circuit which maintains the coordination of vertical and horizontal adjustment of the operating switch in the interior of the vehicle even on 90° rotation of the adjusting drive 6. In case of a left adjusting drive, this circuit technology means exchange of horizontal and vertical motors 8, 9 as well as reversal of the direction of rotation of the vertical motor 9, which now functions as horizontal adjustment means.

As can be seen from FIG. 2, three wires from the operating switch are provided, one wire 10 on which the signal for horizontal adjustment of the mirror glass 5 (adjustment about the vertical axis 13 at the top of FIG. 1) is delivered, one wire 11 on which the signal for vertical adjustment of the mirror glass 5 (adjustment about the horizontal axis 14 at the top of FIG. 1) is delivered, and a common wire 12. The horizontal motor 8 is connected between the wires 10 and 12 and the vertical motor 9 is connected between the wires 11 and 12. In the connections to the motors 8, 9 are inserted contacts $k_1'$ and $k_1''$ which are activated by a relay K1, wherein in the rest state the positive terminal of the horizontal motor 8 is connected to the wire 10 and the positive terminal of the vertical motor 9 is connected by a further contact $k_2$ to the wire 11. The negative terminal of the motor 8 is directly connected to the wire 12, while the negative terminal of the motor 9 is connected by a contact $k_2''$ to the wire 12. The contacts $k_2'$ and $k_2''$ are activated by a relay K2.

Connected in series with the relays K1 and K2 is a position switch S which is open in the position of the mirror head according to the top of FIG. 1. Such a position switch can be designed as a mechanical, optical, electrical, electrooptical, inductive, capacitive, magnetic or gravitational switch or be formed by a combination thereof. The position switch detects the vertical position of the mirror head 3 according to the bottom of FIG. 1 and in this position changes to its closed state. As an example it is conceivable that the switch S is designed as a ball switch which, on pivoting of the mirror head, bridges contacts with its ball. Another embodiment consists in a gravity flap reflecting or interrupting a radiation emitted from a light source (e.g. infra-red source) to a receiver.

As the circuit shown according to FIG. 2 is not permanently connected to voltage, the voltage for supply of the circuit must be obtained from the respective motor signals. For this purpose the wires 10 and 11 are respectively connected to the anodes and cathodes of two diodes each, which in the present case are designed as a rectifier bridge GL2 and form OR links. One pair of diodes is connected to the emitter of a pnp transistor T1 and the other pair of diodes is connected to the emitter of a npn transistor T2, wherein the collectors of the transistors T1, T2 are connected to each other and also connected to a bridge rectifier GL1 via which the voltage is supplied to the relays K1, K2. The respective base of the transistors T1, T2 is connected by a resistor to the wire 12. The bridge rectifier GL1 is connected by the connecting points between the diodes to the relay K1, via the position switch S to the relay K2 and to the wire 12.

As stated, the bridge rectifier GL2 forms an OR link of the signals for horizontal or vertical adjustment, and the transistors T1 and T2 form interlocking of these signals to avoid an inductive disturbance to the other one. As the relays K1, K2 in the practical example are monostable relays of small design which attract in only one direction of voltage, the bridge rectifier GL1 is provided. It can be omitted if other relays are used.

In the state shown in FIG. 2, which corresponds to a mirror glass adjustment according to the top of FIG. 1, in case of horizontal adjustment predetermined by the operating switch in the interior of the vehicle, a motor signal is generated via the wires 10 and 12, wherein, depending on the direction of current, i.e. from wire 10 to wire 12 or from wire 12 to wire 10, the horizontal motor 8 rotates in one or the other direction of rotation and the mirror glass assembly 5 moves via a mechanism or other transmission. In this case the contact $k_1'$ is closed because the position switch S is open and the relay K1 is not excited.

Correspondingly, in case of a signal for the vertical adjustment a current flows through the wire 11, the contacts $k_1''$ and $k_2'$. the motor 9 and the contact $k_2''$ as well as the wire 12 or vice versa, with the result that the motor 9 performs a vertical adjustment of the mirror glass 5.

If the mirror head 3 is rotated manually about the pivot point 7, the position switch S closes, and in case of a motor signal on the respective pair of wires a current flows through two diodes of the rectifier GL2 and one of the transistors T1, T2, wherein, depending on the direction of current, one transistor switches and the other inhibits. As a result the relays K1, K2 are excited and their contacts switch to the position not shown. In case of a horizontal signal on the wires 10, 12, delivered by the operating switch, a current flows from the wire 10 through the contact $k_1''$, $k_2''$ through the motor from negative to positive. the contact $k_2'$ and the wire 12 or vice versa. As the contact $k_1'$ is not connected to the wire 10, no current flows through the horizontal motor 8.

Correspondingly, in case of a signal for vertical adjustment from the operating switch a current flows through the wire 11, the contact $k_1'$, the horizontal motor 8 from positive to negative and the wire 12 or vice versa. It can be seen that in the case shown at the bottom of FIG. 1 the motors 8, 9 are respectively exchanged and in addition the direction of rotation with respect to the signals from one motor is reversed.

In the practical example described, one circuit design is described, but naturally other circuits which can perform exchange of the motors and a reversal of direction of rotation are conceivable.

In FIG. 2 two monostable relays of the same design having two contacts each are used which are normally available at moderate cost and are small. It is, however, also possible to use one relay only having three contacts, contact $k'_1$ being omitted in this case and the positive pole of the motor 8 being connected with contact $k''_1$.

What is claimed is:

1. Drive device for adjusting the mirror assembly of a rear-view mirror with a mirror base and a mirror head which receives the mirror assembly and which is adjustable via a pivot point between a first and a second position, with an electric motor assembly and with an operating switch which predetermines the direction of adjustment of the mirror assembly and which, as a function of its operation, delivers electrical signals to the electric motor assembly for adjustment of the mirror assembly, characterised in that there is provided an electrical/electronic switch-over device which includes a position switch and which switches the signals delivered to the electric motor assembly as a function of the switching state of the position switch in such a way that both in the first and in the second position of the mirror head the coordination between the direction of adjustment predetermined by the operating switch and the direction of adjustment of the mirror assembly is maintained.

2. Drive device according to claim 1, characterised in that the electric motor comprises a first and a second motor, wherein the switch-over device in one switching state of the position switch via a switching device delivers to the first motor a signal delivered for horizontal adjustment by the operating switch and to the second motor a signal delivered for vertical adjustment and in the other switching state of the position switch delivers to the second motor the signal for horizontal adjustment and to the first motor the signal for vertical adjustment.

3. Drive device according to claim 2, characterised in that the coordination between direction of rotation of at least one motor and direction of adjustment of the mirror assembly is altered by the switching device.

4. Drive device according to claim 3, characterised in that the operating switch has four directions of operation which are assigned to the directions of adjustment to the mirror assembly.

5. Drive device according to claim 4, characterised in that the operating switch delivers different voltage signals according to the desired direction of adjustment of the mirror assembly.

6. Drive device according to claim 5, characterised in that the switching device has at least one relay with a total of at least three switch-over contacts with are located in the supply wires to the first and second motors.

7. Drive device according to claim 6, characterised in that two relays are provided whose two switch-over contacts each are located in the supply wire to at least one of the motors.

8. Drive device according to claim 7, characterised in that the relays are designed as monostable relays.

9. Drive device according to claim 8, characterised in that the voltage for supply of the switch-over device is obtained from the respective signals from the operating switch.

10. Drive device according to claim 9, characterised in that the signals from the operating switch are conducted via a locking circuit comprising electronic switching elements, which form interlocking means for the signals delivered by the operating switch.

11. Drive device according to claim 10, characterised in that the position switch is designed as mechanical, electrical, optical, electrooptical, inductive, capacitive, magnetic and/or gravitational switch.

12. Drive device according to claim 1, characterised in that the operating switch has four directions of operation which are assigned to the directions of adjustment to the mirror assembly.

13. Drive device according to claim 12, characterised in that the operating switch delivers different voltage signals according to the desired direction of adjustment of the mirror assembly.

14. Drive device according to claim 13, characterised in that the switching device has at least one relay with a total of at least three switch-over contacts with are located in the supply wires to the first and second motors.

15. Drive device according to claim 14, characterised in that two relays are provided whose two switch-over contacts each are located in the supply wire to at least one of the motors.

16. Drive device according to claim 15, characterised in that the relays are designed as monostable relays.

17. Drive device according to claim 16, characterised in that the voltage for supply of the switch-over device is obtained from the respective signals from the operating switch.

18. Drive device according to claim 17, characterised in that the signals from the operating switch are conducted via a locking circuit comprising electronic switching elements, which form interlocking means for the signals delivered by the operating switch.

19. Drive device according to claim 18, characterised in that the position switch is designed as mechanical, electrical, optical, electrooptical, inductive, capacitive, magnetic and/or gravitational switch.

20. Drive device according to claim 1, characterised in that the operating switch delivers different voltage signals according to the desired direction of adjustment of the mirror assembly.

21. Drive device according to claim 20, characterised in that the switching device has at least one relay with a total of at least three switch-over contacts with are located in the supply wires to the first and second motors.

22. Drive device according to claim 21, characterised in that two relays are provided whose two switch-over contacts each are located in the supply wire to at least one of the motors.

23. Drive device according to claim 22, characterised in that the relays are designed as monostable relays.

24. Drive device according to claim 23, characterised in that the voltage for supply of the switch-over device is obtained from the respective signals from the operating switch.

25. Drive device according to claim 24, characterised in that the signals from the operating switch are conducted via a locking circuit comprising electronic switching elements, which form interlocking means for the signals delivered by the operating switch.

26. Drive device according to claim 25, characterised in that the position switch is designed as mechanical, electrical, optical, electrooptical, inductive, capacitive, magnetic and/or gravitational switch.

27. Drive device according to claim 2, characterised in that the switching device has at least one relay with a total of at least three switch-over contacts with are located in the supply wires to the first and second motors.

28. Drive device according to claim 27, characterised in that two relays are provided whose two switch-over contacts each are located in the supply wire to at least one of the motors.

29. Drive device according to claim 28, characterised in that the relays are designed as monostable relays.

30. Drive device according to claim 29, characterised in that the voltage for supply of the switch-over device is obtained from the respective signals from the operating switch.

31. Drive device according to claim 30, characterised in that the signals from the operating switch are conducted via a locking circuit comprising electronic switching elements, which form interlocking means for the signals delivered by the operating switch.

32. Drive device according to claim 31, characterised in that the position switch is designed as mechanical, electrical, optical, electrooptical, inductive, capacitive, magnetic and/or gravitational switch.

33. Drive device according to claim 1, characterised in that the voltage for supply of the switch-over device is obtained from the respective signals from the operating switch.

34. Drive device according to claim 33, characterised in that the signals from the operating switch are conducted via a locking circuit comprising electronic switching elements, which form interlocking means for the signals delivered by the operating switch.

35. Drive device according to claim 34, characterised in that the position switch is designed as mechanical, electrical, optical, electrooptical, inductive, capacitive, magnetic and/or gravitational switch.

36. Drive device according to claim 1, characterised in that the position switch is designed as mechanical, electrical, optical, electrooptical, inductive, capacitive, magnetic and/or gravitational switch.

* * * * *